Figure 4:
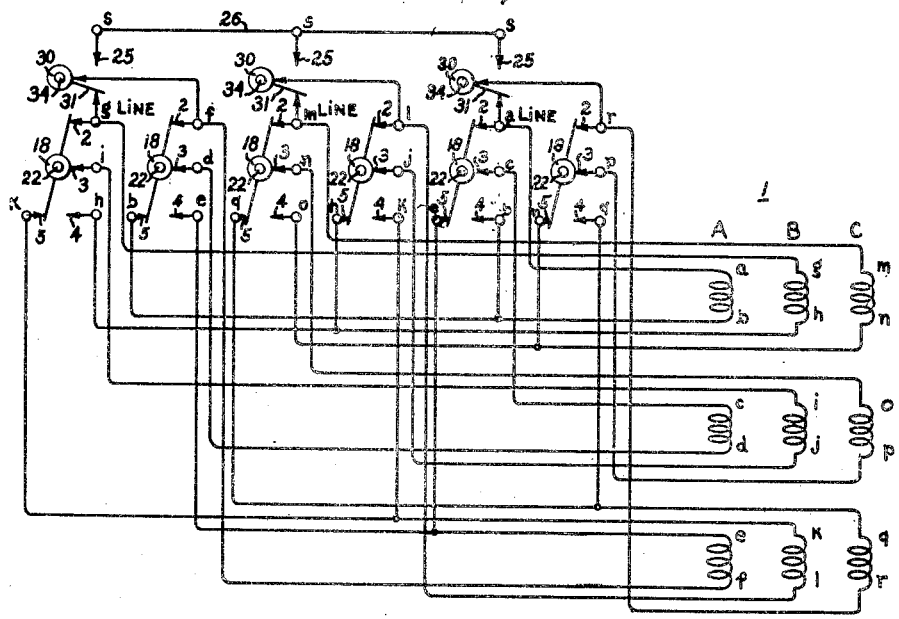

April 5, 1949.   W. J. CUTHBERTSON ET AL   2,466,388
ELECTRIC SWITCH
Filed July 30, 1946   2 Sheets-Sheet 1
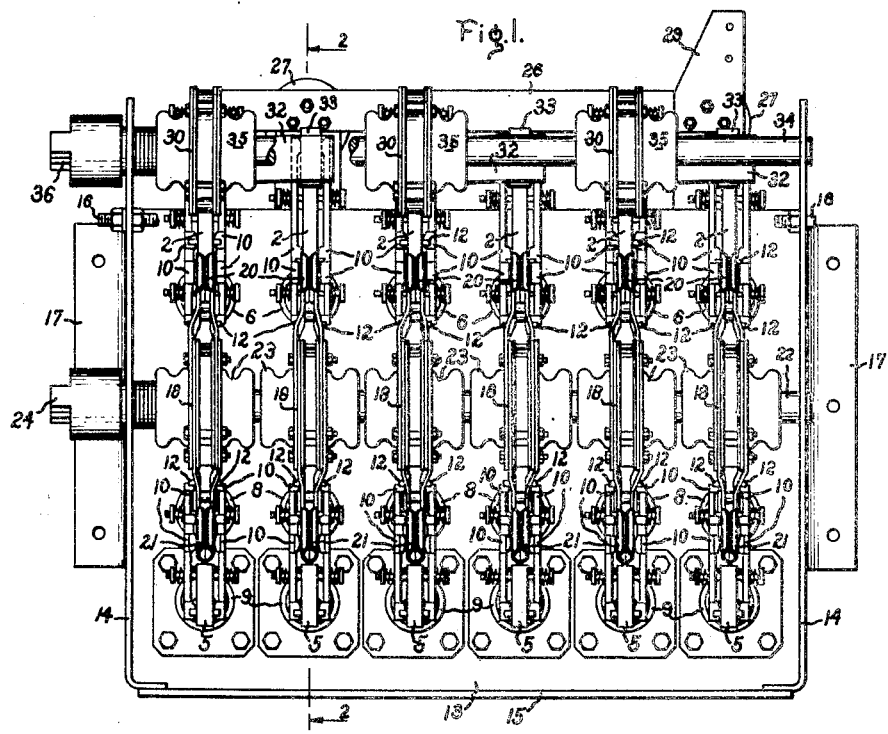
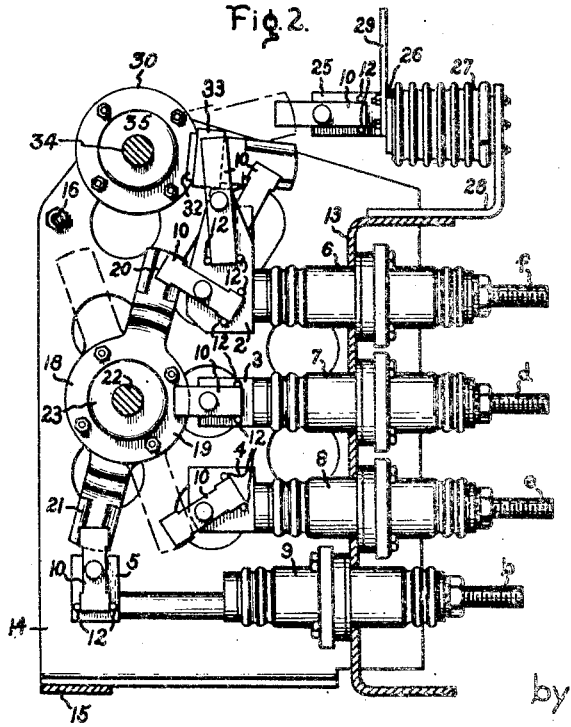
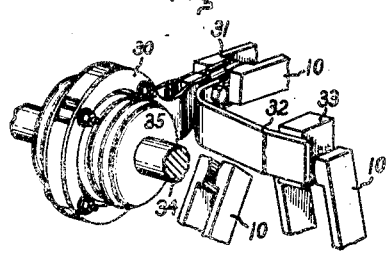
Inventors:
William J. Cuthbertson,
LeRoy S. Schell, Jr.,
by
Their Attorney.

April 5, 1949. W. J. CUTHBERTSON ET AL 2,466,388
ELECTRIC SWITCH
Filed July 30, 1946 2 Sheets-Sheet 2

Inventors:
William J. Cuthbertson,
Le Roy S. Schell, Jr.
by Ernest C Britton
Their Attorney Patented Apr. 5, 1949

2,466,388

UNITED STATES PATENT OFFICE 2,466,388

ELECTRIC SWITCH

William J. Cuthbertson, Pittsfield, and Le Roy S. Schell, Jr., Lenox, Mass., assignors to General Electric Company, a corporation of New York Application July 30, 1946, Serial No. 687,200

2 Claims. (Cl. 200—5)

Our invention relates to improvements in electric multiple terminal interconnecting switches and more particularly to improvements in such switches for connecting the winding terminals of three-phase electrical apparatus in series-wye, series-delta, parallel-wye or parallel-delta.

For changing the terminal connections of polyphase electrical apparatus such as the windings of power transformers so as to obtain various voltages, the windings may be connected in series-wye, series-delta, parallel-wye or parallel-delta. For this purpose, terminal boards with selectively connected jumpers, and the like have been generally used. These, however, are awkward, inconvenient and subject to erroneous connections especially when relatively frequent changes are necessary as in mobile power stations. To connect existing forms of switches with the terminal boards for establishing the different connections, although this might be convenient and dependable for quick changes, would result in too large a transformer unit particularly for a multiplicity of voltages and especially so since it is desirable to have the switches mounted within the transformer housing. Minimum space, however, is one of the fundamental requirements of a mobile power station. This requirement is in a measure incompatible with the connection requirements especially for a multiplicity of voltage ratios.

An object of our invention is to provide an improved electric multiple terminal interconnecting switch which is particularly adapted for connecting the windings of three-phase apparatus in series-wye, series-delta, parallel-wye or parallel-delta. Another object of our invention is to provide a compact series-parallel wye-delta switch which requires a minimum of space and yet has the necessary terminal insulation level. A further object of our invention is to provide an improved high voltage series-parallel wye-delta switch which can be readily mounted within a transformer casing. These and other objects of our invention will appear in more detail hereinafter.

In accordance with our invention, we provide an electric multiple terminal interconnecting switch comprising juxtaposed and aligned sets of a plurality of movable terminal members and having each member provided with a stationary switch contact together with an aligned switch rotor having juxtaposed switch blade members operable to one circuit controlling position to establish an electric current conducting connection between certain terminal members in each set and a predetermined terminal member of the set and to another circuit controlling position to establish an electric current conducting connection between said predetermined terminal member and another terminal member of the set. Further in accordance with our invention, we provide a plurality of electrically interconnected terminal members, one for each pair of the sets of a plurality of terminal members, together with a second aligned switch rotor having juxtaposed switch blades with lateral offsets operable to one circuit controlling position to establish an electric current conducting connection between one of said predetermined terminal members of one set of each of the pairs of sets of a plurality of terminal members and the respectively associated terminal member of the plurality of interconnected terminal members and to another circuit controlling position to establish an electric current conducting connection between said one of said predetermined terminal members of the one set of a pair of a plurality of terminal members and the corresponding terminal member of the other set of the pair.

Our invention will be better understood from the following description when considered in connection with the accompanying two sheets of drawings, and its scope will be pointed out in the appended claims.

In the accompanying drawings, Fig. 1 is an elevation of an electric switch embodying our invention; Fig. 2 is a sectional and elevational view on the line 2—2 of Fig. 1; Fig. 3 is a perspective view of a part of the embodiment of our invention shown in Figs. 1 and 2; Fig. 4 is a circuit diagram illustrating the connections of a three-phase multiple winding power transformer to the terminals of a switch embodying our invention with the movable circuit controlling elements of the switch in position to establish a parallel-delta connection of the transformer windings; and Fig. 5 is a circuit diagram similar to Fig. 4 with the movable circuit controlling elements of the switch in position to establish a series-wye connection of the transformer windings.

Figure 5:
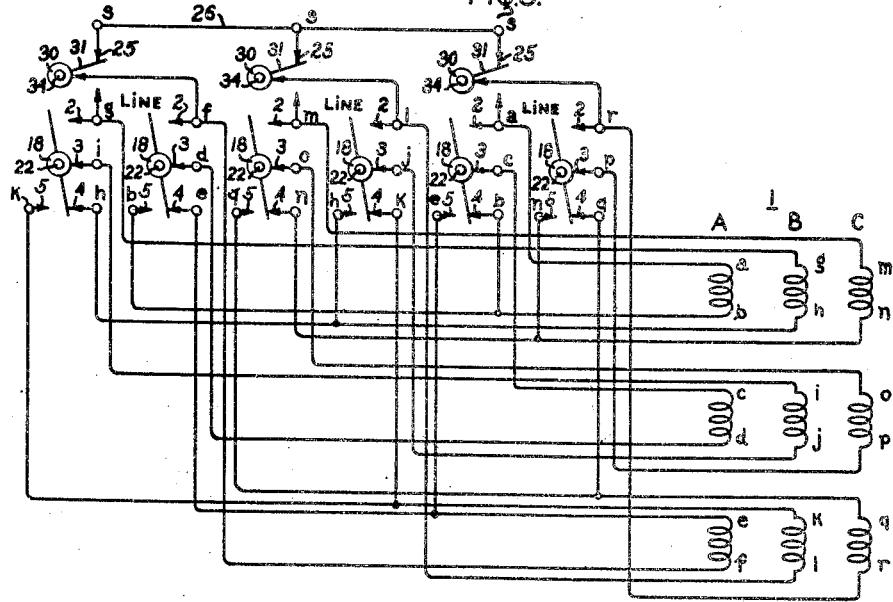

In the accompanying two sheets of drawings, we have illustrated an embodiment of our invention in an electric switch adapted for interconnecting, for example, the output windings of a three-winding three-phase power transformer 1, shown only in Figs. 4 and 5, in series-wye, series delta, parallel-wye or parallel-delta. As shown, the transformer 1, comprises phases A, B and C, phase A having windings *a—b*, *c—d*, and *e—f*; phase B having windings *g—h*, *i—j*, and *k—l*; and phase C having windings *m—n*, *o—p*, and *q—r*. In Fig. 4, the switch is shown in the parallel-delta connecting position, and in Fig. 5, the switch is shown in the series-wye connecting position. While switches embodying our invention are especially applicable to a polyphase multiwinding transformer, it is to be understood that such switches may also be used with a plurality of single winding polyphase transformers.

In the illustrated embodiment of our invention, we have shown an electric switch comprising six juxtaposed sets of four planar spaced stationary contacts 2, 3, 4 and 5 which are respectively mounted on the aligned high voltage insulators 6, 7, 8 and 9 provided with terminals designated by lower case letters corresponding to the designations of the terminals of the transformer windings as shown in Figs. 4 and 5. In the illustrated embodiment of our invention, each of the four planar aligned stationary contacts is provided with a pair of pivotally and resiliently mounted jaw type contact elements 10 shaped at the ends to provide line contact and limited against turning about their pivotal axes by stops 12. The insulators 6, 7, 8 and 9, as shown, are suitably secured in vertical alignment to a channel shaped base 13 of suitable material. This base is supported from side members 14 which are cross connected by a framing element 15 and a through bolt 16, broken away in Fig. 1 for clearness. Also, as shown, the side members 14 are perforated for free circulation of the insulating fluid in the transformer. For mounting the assembly, brackets 17 secured to the side members 14 are provided.

In accordance with our invention, we provide for each set of four stationary contacts 2, 3, 4 and 5 a movable circuit controlling member 18 which is aligned so as to be operable to one circuit controlling position, the parallel connecting position shown in Figs. 1, 2 and 4, to interconnect the three contacts 2, 3 and 5 and to another circuit controlling position, the series connecting position shown in Fig. 5 and in dotted lines in Fig. 2, to interconnect the contacts 3 and 4. As shown, the circuit controlling member 18 is of the double blade type with a central annular contact portion 19 which continuously engages the contact 3, a blade extension 20 which is movable into engagement with the contact elements 10 on the contact 2 and a blade extension 21 which is movable into engagement with the contact elements 10 on either the contact 4 or the contact 5.

In order to have the six circuit controlling members 18 simultaneously movable, they are mounted on a rotor shaft 22 which is journaled in the side members 14. Each of the circuit controlling members 18 is rigidly secured to an insulator 23 so as to turn therewith, and the insulators 23 are rigidly secured to the rotor shaft 22 so as to turn therewith. For turning the rotor shaft 22, it is provided, as shown, with part of a jaw coupling 24 which is engageable by the other half of the jaw coupling arranged to be operated from outside of the transformer tank, as will be obvious to those skilled in the art.

Further in accordance with our invention, we provide a fifth or auxiliary stationary contact 25 for each pair of adjacent sets of four stationary contacts 2, 3, 4 and 5 so that in cooperation with these sets, delta and wye connections are available with either series or parallel connections. As shown, each of the three juxtaposed auxiliary contacts 25 is provided with jaw contact elements 10 similar to those provided for the contacts 2, 3, 4 and 5. The contacts 25 mounted on a connecting bus 26 which is supported on two insulators 27. These insulators are mounted on brackets 28 secured to a flange of the base 13. Also, the bus bar 26 is provided with a grounding terminal 29. In accordance with our invention, we provide for each of the contacts 25 a cooperating movable circuit controlling member 30 which is operable in one circuit controlling position, the delta position shown in Figs. 1, 2 and 4, to interconnect one of the four stationary contacts 2, 3, 4 and 5, such as 2, of one set with the corresponding contact 2 in the adjacent set and in another circuit controlling position, the wye position shown in Figs. 3 and 5 and in dotted lines in Fig. 2, to interconnect the contact 2 of the adjacent set of four contacts on the right with the associated fifth contact 25. As shown, the cooperating circuit controlling member 30 is of the double blade type with a blade extension 31 which is movable into engagement with either the contact 2 of the left-hand set of pair of adjacent sets of four stationary contacts or the contact 25 associated with such left-hand set. Also, the cooperating circuit controlling member 30 is provided with a laterally offset blade extension 32 projecting substantially perpendicularly from the blade extension 31 and carrying a relatively long contact block 33 which is continuously in engagement with the contact 2 on the right-hand set of a pair of adjacent sets of contacts.

In order to have the three cooperating circuit controlling members 30 simultaneously movable, they are mounted on an auxiliary rotor shaft 34 which is journaled in the side members 14. Each of the cooperating circuit controlling members 30 is rigidly secured to an insulator 35 so as to turn therewith, and the insulators 35 are rigidly secured to the rotor shaft 34 so as to turn therewith. For turning the shaft 34, it is provided, as shown, with part of a jaw coupling 36 which is engageable by the other half of the jaw coupling arranged to be operated from outside of the transformer tank, as will be obvious to those skilled in the art.

Assuming the parts positioned as shown in Fig. 1 and as shown in full lines in Fig. 2, then the transformer connections are parallel-delta, as will be apparent from the circuit diagram shown in Fig. 4 wherein the windings *a—b*, *c—d*, *e—f* of phase A and the windings *g—h*, *i—j*, *k—l* of phase B and the windings *m—n*, *o—p*, *q—r* of phase C are connected in parallel in each phase and the respective phases are connected in delta. If it is desired to change from the delta-parallel connection to the wye-parallel connection, then the shaft 34 is turned counterclockwise until the cooperating circuit controlling member 30 is in the position shown in Fig. 3 and in dotted lines in Fig. 2. During this movement, the blade member 31 is moved from the contact 2 of the left-hand set of a pair of sets of four stationary contacts 2, 3, 4 and 5 to the contact 25 associated with the set while the blade projection 32 through its block 33 remains in contact with the contact 2 of the adjacent set of four stationary contacts. During this counterclockwise movement of the cooperating circuit controlling member 30, the phase connections are changed from delta to wye.

If it is desired to have a series-wye connection, then from the position shown in Figs. 1 and 4 in solid lines in Fig. 2 both of the shafts 22 and 34 are turned counterclockwise to the position shown in Fig. 5 and in dotted line in Fig. 2. The phases are now connected in wye and the windings of each phase are connected in series as will be apparent from Fig. 5. If it is desired to have a series-delta connection, then the shaft 34 is turned clockwise to the full line position shown in Fig. 2 thereby connecting the phase windings in delta.

In the circuit diagrams shown in Figs. 4 and 5, it is to be understood that the switch terminals *a*, *m* and *g* are the line terminals as indicated by the designation "Line."

While we have shown and described our invention in considerable detail, we do not desire to be limited to the exact arrangements shown, but seek to cover in the appended claims all those modifications that fall within the true spirit and scope of our invention.

What we claim is new and desire to secure by Letters Patent of the United States is:

1. An electric multiple terminal interconnecting switch comprising a plurality of juxtaposed sets of aligned terminal members having each member provided with a stationary switch contact, a first switch rotor having juxtaposed double blades, each in alignment for engaging in one angular position of said rotor with the corresponding stationary switch contacts of a corresponding terminal set to establish an electric current conducting connection between two terminal members in said set and a third terminal member of the set and in another angular position of said rotor with the corresponding stationary switch contacts to establish an electric current conducting connection between one of said two terminal members and another terminal member of the set, a plurality of electrically interconnected auxiliary stationary switch contacts, each in alignment with one of each pair of adjacent sets of terminal members, and a second switch rotor having laterally offset blades operable to one circuit controlling position for engaging with the corresponding stationary switch contacts to establish an electric current conducting connection between said third terminal member of alternate sets of terminal members and the corresponding one of said interconnected auxiliary stationary switch contacts and to another circuit controlling position for engaging with the corresponding stationary switch contacts to establish an electric current conducting connection between said third terminal members of each pair of adjacent sets of terminal members.

2. A combined series-parallel delta-wye interconnecting switch comprising six juxtaposed sets of first, second, third and fourth terminal members in planar alignment and having one end of the fourth member projecting beyond the corresponding ends of the other three members and said ends of each member provided with a stationary switch contact and the said end of the first member of each set provided with an auxiliary lateral stationary switch contact, a first switch rotor having an axis extending opposite the second terminal member of each set and provided with six juxtaposed multiple-contact blades, each centrally mounted on the rotor in planar alignment for engaging in one angular position of the rotor with the first, second, and fourth stationary switch contacts of a corresponding terminal set to establish parallel electric current conducting connections therebetween and for engaging in another angular position of said rotor with the second and third stationary switch contacts in the set to establish a series electric current conducting connection therebetween, three electrically interconnected stationary switch contacts, each in spaced-apart planar alignment with the auxiliary contact of the first terminal member of a corresponding one of each pair of adjacent sets of terminal members, and a second switch rotor having three juxtaposed multiple contact offset blades, each aligned for engaging in one angular position of said second rotor with the auxiliary contacts of the first terminal member of a corresponding pair of adjacent sets of terminal members to establish a delta current conducting connection therebetween and for engaging in another angular position of said second rotor with a corresponding one of said electrically interconnected auxiliary stationary switch contacts and the auxiliary contact of the first member of the other of each pair of adjacent sets of terminal members to establish a wye current conducting connection therebetween.

WILLIAM J. CUTHBERTSON.
LE ROY S. SCHELL, Jr.

REFERENCES CITED

The following references are of record in the file of this patent:

UNITED STATES PATENTS

| Number | Name | Date |
| --- | --- | --- |
| 507,144 | Lundell | Oct. 24, 1893 |
| 1,273,211 | Flogerzi | July 23, 1918 |
| 2,217,460 | Trassl | Oct. 8, 1940 |